United States Patent
Arnett

(10) Patent No.: US 6,290,208 B1
(45) Date of Patent: Sep. 18, 2001

(54) VALVE SEAL, INCLUDING FOR DUPLEX HEAD

(75) Inventor: John Arnett, Cookeville, TN (US)

(73) Assignee: Fleetguard, Inc., Nashville, TN (US)

(*) Notice: Subject to any disclaimer, the term of this patent is extended or adjusted under 35 U.S.C. 154(b) by 0 days.

(21) Appl. No.: 09/433,400

(22) Filed: Nov. 3, 1999

(51) Int. Cl.$^7$ ................................ G05D 25/00
(52) U.S. Cl. ............... 251/185; 137/625.11; 137/625.29; 251/175
(58) Field of Search .................... 251/181, 182, 251/185, 175; 137/625.11

(56) References Cited

U.S. PATENT DOCUMENTS

| | | | |
|---|---|---|---|
| 2,371,657 | * | 3/1945 | Stack ..................................... 251/182 |
| 2,840,109 | * | 6/1958 | Wadleigh . |
| 2,989,082 | * | 6/1961 | Ray ................................... 251/185 X |
| 2,996,083 | * | 8/1961 | Huska . |
| 4,305,417 | * | 12/1981 | Bell, Jr. ............................ 137/119.03 |
| 5,887,569 | * | 3/1999 | Romanelli et al. ................... 123/450 |

* cited by examiner

Primary Examiner—Stephen M. Hepperle

(57) ABSTRACT

A duplex fluid filter assembly has first and second alternate duty filters. A valve assembly controls fluid flow between respective alternate flow paths. The valve assembly has a stationary valve body having an inner cylindrical wall defining a hollow cylindrical interior extending along an axis, and plural radial ports having inner ends opening into the hollow interior and communicating with an inlet, an outlet, and respectively entrances and exits of respective flow paths. A movable valve member has an outer cylindrical wall defining a cylinder extending along the axis in the hollow cylindrical interior of the valve body, and is rotatable about the axis. The valve member has first and second axially spaced interior passages, and first and second sets of transfer passages extending radially outwardly from respective interior passages. A plurality of valve seal assemblies are provided, one in each of the transfer passages, each valve seal assembly having a seal element with an outer face portion at the outer end of a respective transfer passage and engaging the inner cylindrical wall of the valve body and circumferentially movable across and into and out of radial alignment with the inner end of the respective radial port in the valve body.

6 Claims, 5 Drawing Sheets

VALVE SEAL, INCLUDING FOR DUPLEX HEAD

BACKGROUND AND SUMMARY

The invention relates to a valve assembly with a leak-free seal, including in a duplex fluid filter assembly.

The invention arose during development efforts relating to a duplex fluid filter assembly. A duplex filter head has first and second filters attached thereto for alternate duty. The duplex head provides a first flow passage through the first filter, and a second flow passage through the second filter. The duplex head has an inlet and an outlet, and a valve having a first position connecting the inlet to the entrance of the first flow passage, and connecting the outlet to the exit from the first flow passage, and having a second position connecting the inlet to the entrance to the second flow passage and connecting the outlet to the exit from the second flow passage. In the first position of the valve, the first filter is on-line and on-duty, while the second filter is off-line and off-duty, and vice-versa for the second position of the valve. This enables the user to remove a dirty filter and replace it with a clean filter without interrupting operation of the engine or machine. For example, to change the first filter, the valve is moved to the noted second position placing the second filter on-line, and the first filter off-line. Fluid for the engine or machine, such as lubricating oil or fuel, is filtered by the second filter while the first filter is being replaced.

The present invention provides a leak-free seal for the above noted duplex fluid filter assembly. The invention is not limited thereto, and may be used in other valve assemblies.

DETAILED DESCRIPTION

Figure 1:
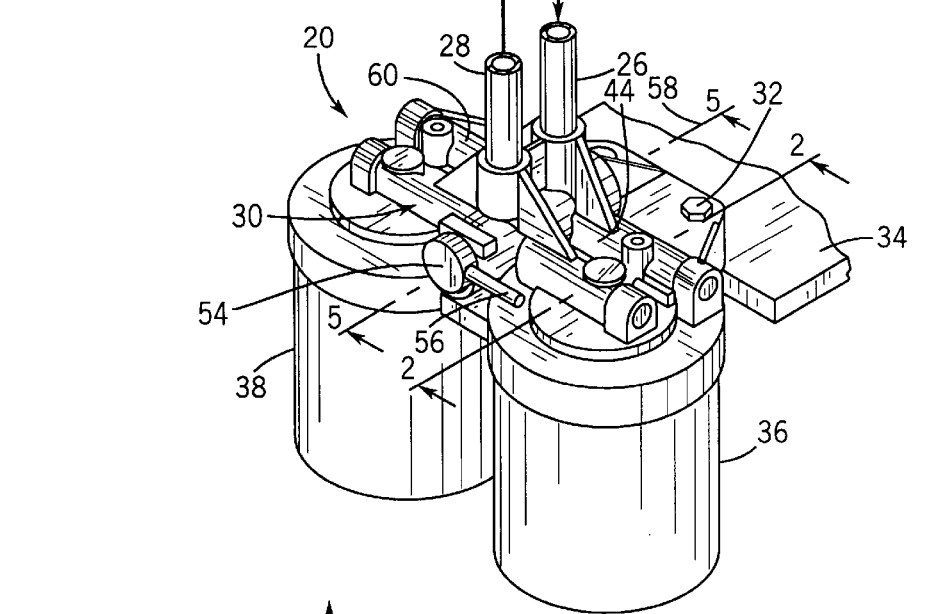
FIG. 1 is a perspective view of a duplex fluid filter assembly incorporating the present invention.
Figure 2:
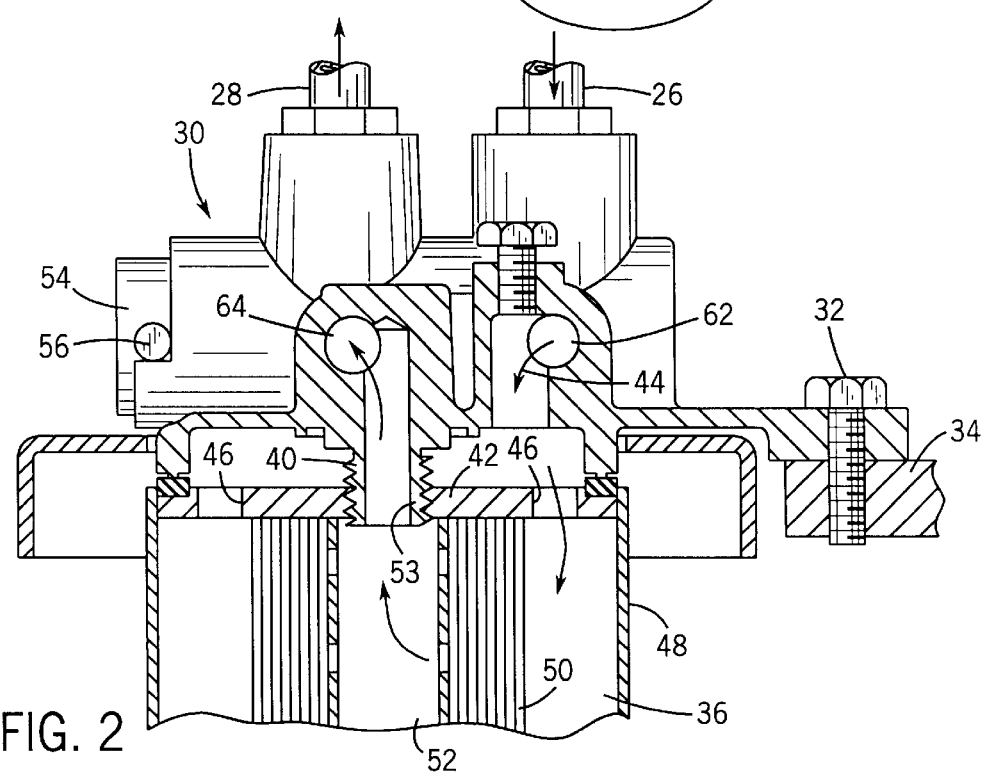
FIG. 2 is a sectional view taken along line 2—2 of FIG. 1.
Figure 7:
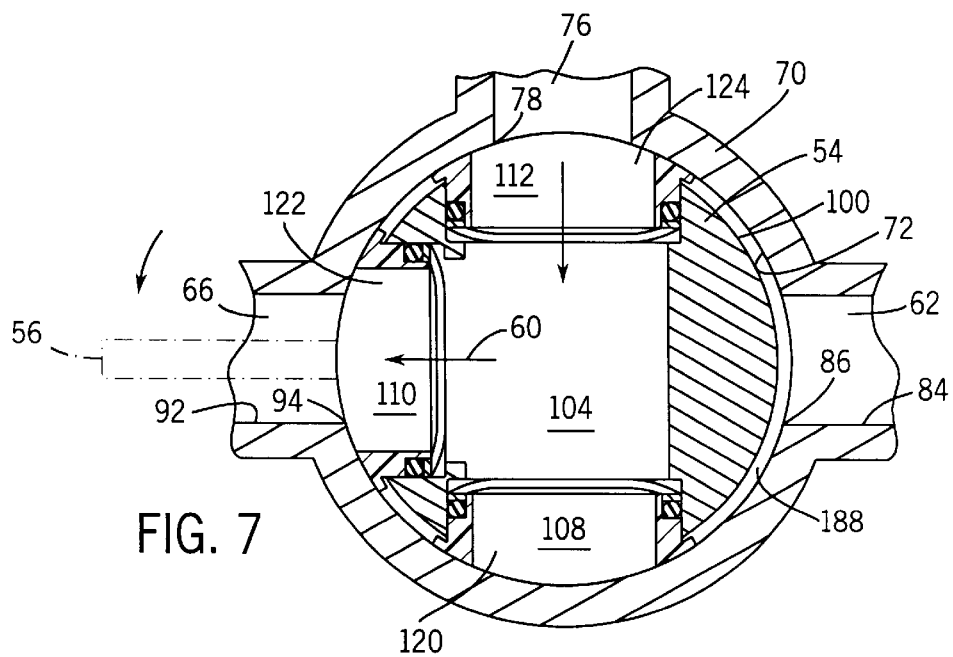
FIG. 7 is a view like FIG. 6 and shows another operational position of the valve.
Figure 8:
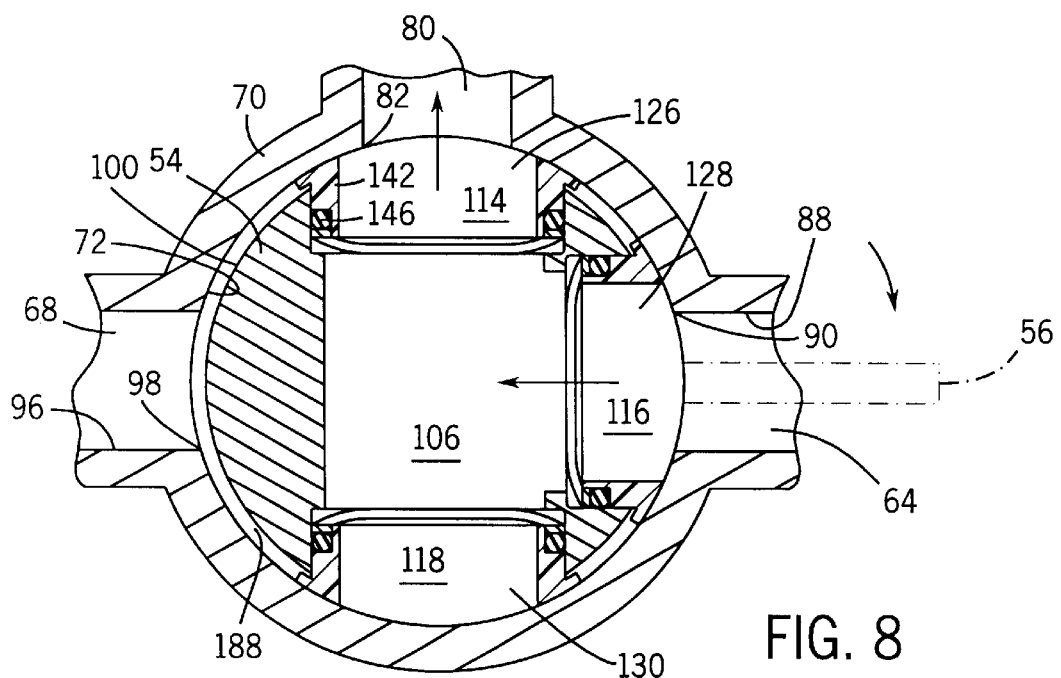
FIG. 8 is a sectional view taken along line 8—8 of FIG. 5.
Figure 9:
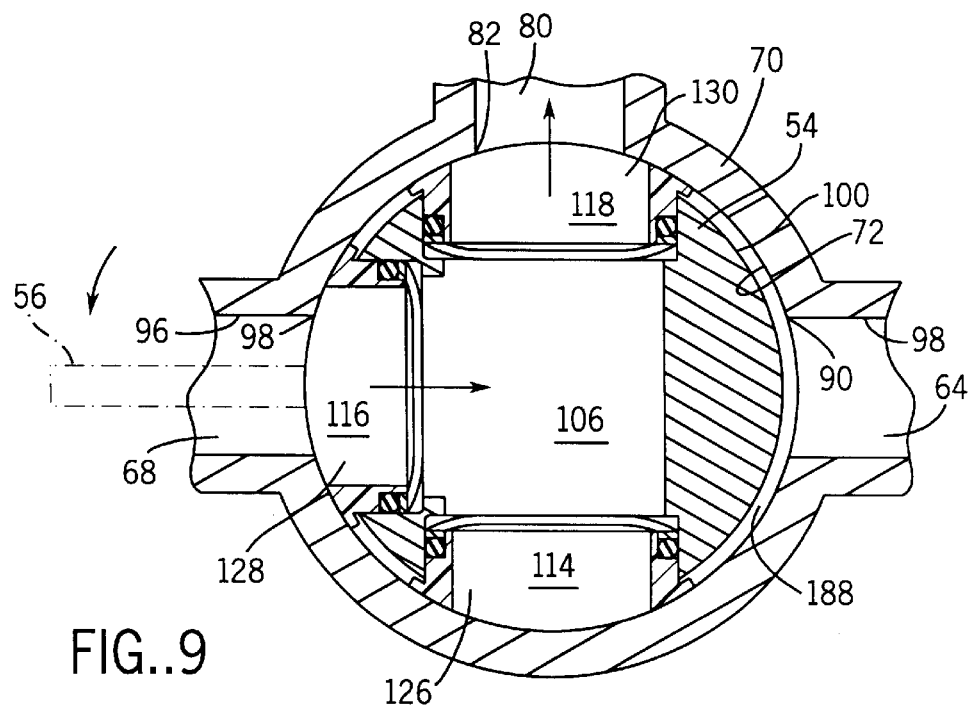
FIG. 9 is a view like FIG. 8 and shows another operational position of the valve.

FIG. 1 shows a duplex fluid filter assembly 20 for filtering fluid, such as lubricating oil or fuel, for a machine, for example internal combustion engine 22. In the disclosed embodiment, oil from sump 24 of the engine is supplied to inlet 26 of the filter assembly which filters the oil and then returns it at outlet 28 back to the engine. The assembly includes a duplex filter head 30 mounted in a suitable location in the engine compartment, for example by bolts 32 to manifold or block 34. The filter head has first and second filters 36 and 38 attached thereto in conventional manner, for example by a male threaded stud 40, FIG. 2, extending downwardly from the filter head and engaging adapter plate 42 of the filter in thread tightened relation. The filter head has a first flow passage 44 through first filter 36 in conventional manner. Fluid flows from inlet 26 through a plurality of apertures 46 in adapter plate 42 into annular space 48 and then radially inwardly through filter element 50 into hollow interior 52 and then through central outlet 53 to outlet 28. Fluid flows from inlet 26 to outlet 28 along the noted first flow path 44 when movable valve member 54 is in a first rotated position, to be described, with handle 56 pointing rightwardly at the 3 o'clock position as shown in FIGS. 1, 3, 6, and 8. When valve member 54 is rotated counter-clockwise about axis 58 such that handle 56 points leftwardly in the 9 o'clock position, FIGS. 7 and 9, fluid flows from inlet 26 along a second flow passage 60 through second filter 38 to outlet 28, in comparable manner to first flow passage 44 through first filter 36. In the position shown in FIGS. 1, 2, 6 and 8, first filter 36 is on-line and on-duty and filters the lubricating oil for engine 22, and second filter 38 is off-line and off-duty and may be removed and replaced by a clean filter if necessary. When valve member 54 is rotated counter-clockwise about axis 58, moving handle 56 to the 9 o'clock position shown in FIGS. 7 and 9, second filter 38 is on-line and on-duty and filters the lubricating oil for engine 22, and first filter 36 is off-line and off-duty and can be removed and replaced with a clean filter if necessary. First flow passage 44 has an entrance 62, FIGS. 2 and 6, for flow to first filter 36, and an exit 64, FIGS. 2 and 8, for flow from first filter 36. Second flow passage 60 has an entrance 66, FIG. 7, for flow to second filter 38, and an exit 68, FIG. 9, for flow from second filter 38. Valve 54 has the noted clockwise rotated first position, FIGS. 1, 2, 6, 8, connecting inlet 26 to entrance 62 of first flow passage 44 and connecting outlet 28 to exit 64 of first flow passage 44. Valve 54 has the noted counter-clockwise rotated second position, FIGS. 7, 9, connecting inlet 26 to entrance 66 of second flow passage 60 and connecting outlet 28 to exit 68 of second flow passage 60. Duplex filter head 30 is known in the prior art and has only briefly been described.

Figure 3:
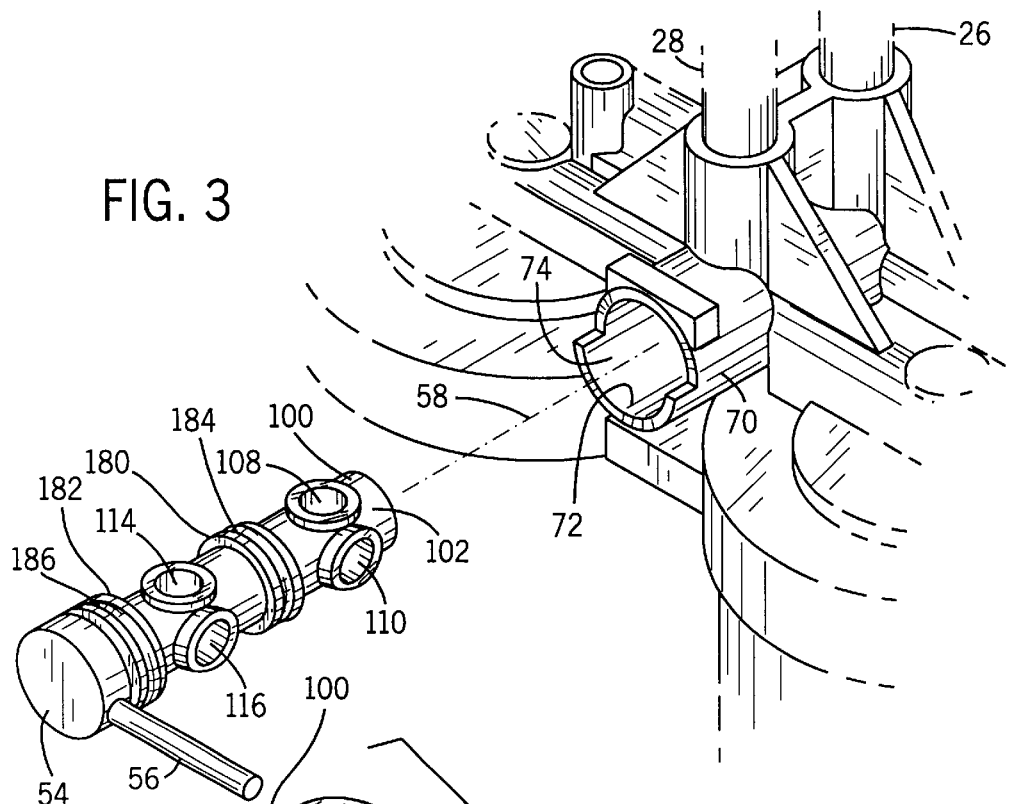
FIG. 3 is an exploded enlarged view of a portion of FIG. 1.
Figure 5:
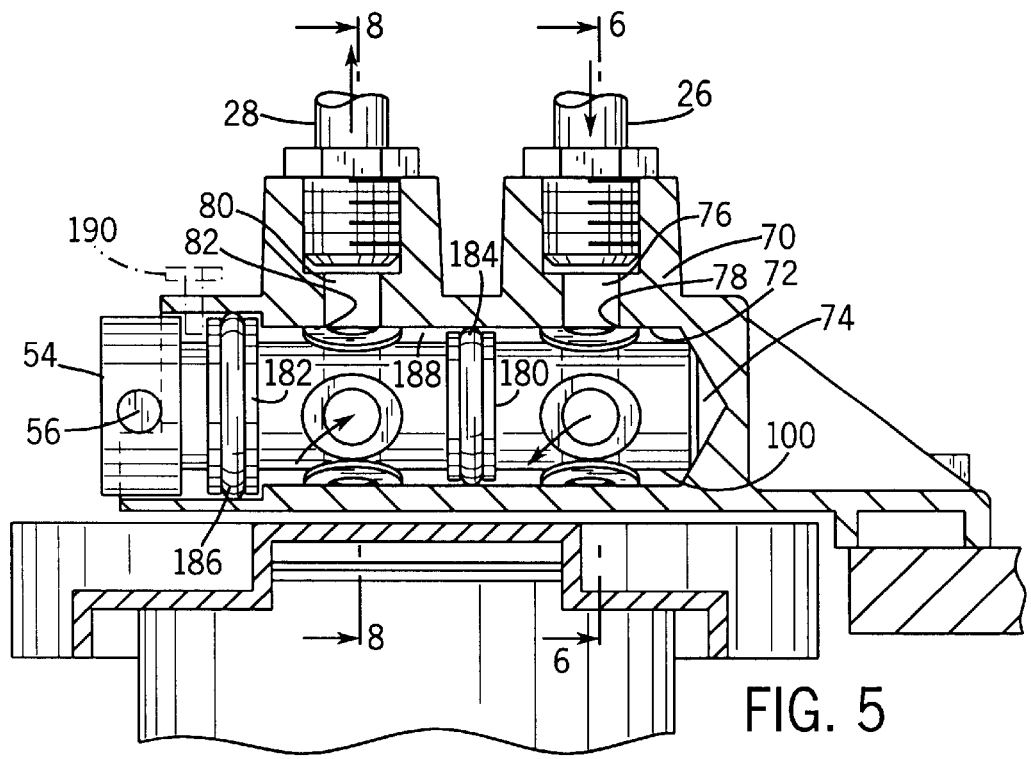
FIG. 5 is a sectional view taken along line 5—5 of FIG. 1.

The valve assembly includes a stationary valve body 70, FIGS. 3 and 5, having an inner cylindrical wall 72 defining a hollow cylindrical interior 74 extending along axis 58. Valve body 70 has a first radial port 76, FIGS. 5–7, having an inner end 78 opening into hollow interior 74 and communicating with inlet 26. Valve body 70 has a second radial port 80, FIGS. 5, 8, 9, having an inner end 82 opening into hollow interior 74 and communicating with outlet 28. Valve body 70 has a third radial port 84, FIGS. 6, 7, having an inner end 86 opening into hollow interior 74 and communicating with entrance 62 of first flow passage 44. Valve body 70 has a fourth radial port 88 having an inner end 90 opening into hollow interior 74 and communicating with exit 64 of first flow passage 44. Valve body 70 has a fifth radial port 92 having an inner end 94 opening into hollow interior 74 and communicating with entrance 66 of second flow passage 60. Valve body 70 has a sixth radial port 96 having an inner end 98 opening into hollow interior 74 and communicating with exit 68 of second flow passage 60. Movable valve member 54 has an outer cylindrical wall 100, FIGS. 3, 5, defining a cylinder 102 extending along axis 58 in hollow interior 74 of valve body 70. As noted above, valve member 54 is rotatable about axis 58. Valve member 54 has first and second axially spaced interior passages 104 and 106, FIGS. 6–9, and first and second sets of transfer passages extending radially outwardly from the first and second interior passages, respectively. The first set of transfer passages is provided by first, second and third transfer passages 108, 110, 112, FIGS. 3, 6, 7. The second set of transfer passages is provided by first, second and third transfer passages, 114, 116, 118, FIGS. 3, 8, 9. In the noted clockwise rotated first position of valve 54, with handle 56 pointing rightwardly in the 3 o'clock position, FIGS. 1–3, 6, 8, transfer passage 108 is radially aligned with radial port 76, transfer passage 110 is radially aligned with radial port 84, transfer passage 114 is radially aligned with radial port 80, and transfer passage 116 is radially aligned with radial port 88. In the noted counter-clockwise second position of valve 54, with handle 56 pointing leftwardly to the 9 o'clock position, FIGS. 7, 9, transfer passage 112 is radially aligned with radial port 76, transfer passage 110 is radially aligned with radial port 92, transfer passage 118 is radially aligned with radial port 80, and transfer passage 116 is radially aligned with radial port 96. Transfer passages 108, 110, 112, extend radially outwardly from interior passage 104. Transfer passages 114, 116, 118 extend radially outwardly from interior passage 106. Transfer passages 108, 110, 112, 114, 116, 118, have outer ends 120, 122, 124, 126, 128, 130, respectively, facing inner cylindrical wall 72 of valve body 70. The structure described thus far is known in the prior art.

The present invention provides a valve seal assembly for the above noted structure. In the prior art, such structure had no seal between movable valve member 54 and valve housing 70 at the noted radial ports 76, 84, 92, 80, 88, 96 and the transfer passages 108, 110, 112, 114, 116, 118.

In accordance with the present invention, a plurality of valve seal assemblies are provided, one in each of the noted transfer passages. One of the valve seal assemblies is shown in exploded perspective view at 140 in FIG. 4 and includes a seal element 142 having an outer face portion 144 at the outer end of its respective transfer passage, such as outer end 120 of transfer passage 108, FIG. 10, and engaging inner cylindrical wall 72 of valve body 70 and circumferencially movable across and into and out of radial alignment with inner end 78 of radial port 76, FIGS. 6, 7. Valve seal assembly 140 further includes an O-ring 146 in sealing engagement between seal element 142 and valve member 54. Valve seal assembly 140 further includes a biasing member 148, preferably provided by a spring steel wave washer, bearing between valve member 54 and seal element 142 and biasing the latter outwardly into biased engagement with inner cylindrical wall 72 of valve body 70. Seal element 142 includes a hollow tubular sleeve portion 150 extending radially inwardly from outer face portion 144 into transfer passage 108 and slidable therealong in a radial direction 152 relative to axis 58. Sleeve portion 150 and outer face portion 144 have a central passage 154 therethrough common and colinear with transfer passage 108. Sleeve portion 150, O-ring 146 and biasing member 148 are all in transfer passage 108 and are colinearly aligned annuli concentrically surrounding and defining central passage 154 therethrough.

Figure 4:
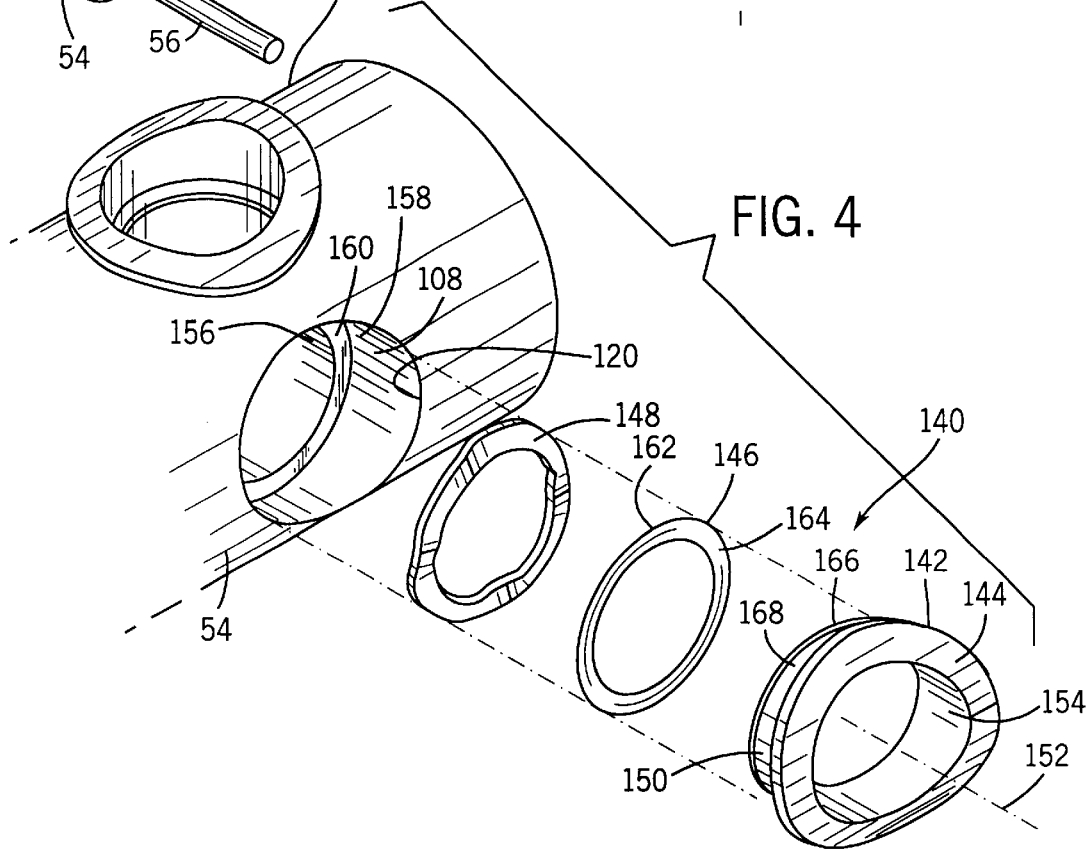
FIG. 4 is an exploded enlarged view of a portion of FIG. 3.
Figure 10:
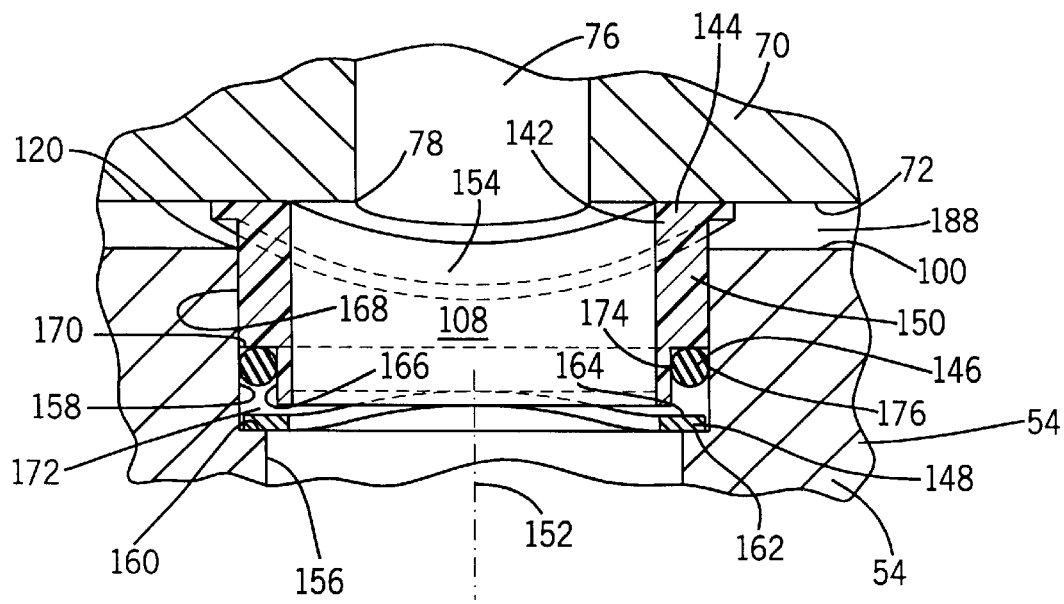
FIG. 10 is a sectional view taken along line 10—10 of FIG. 6.
Figure 6:
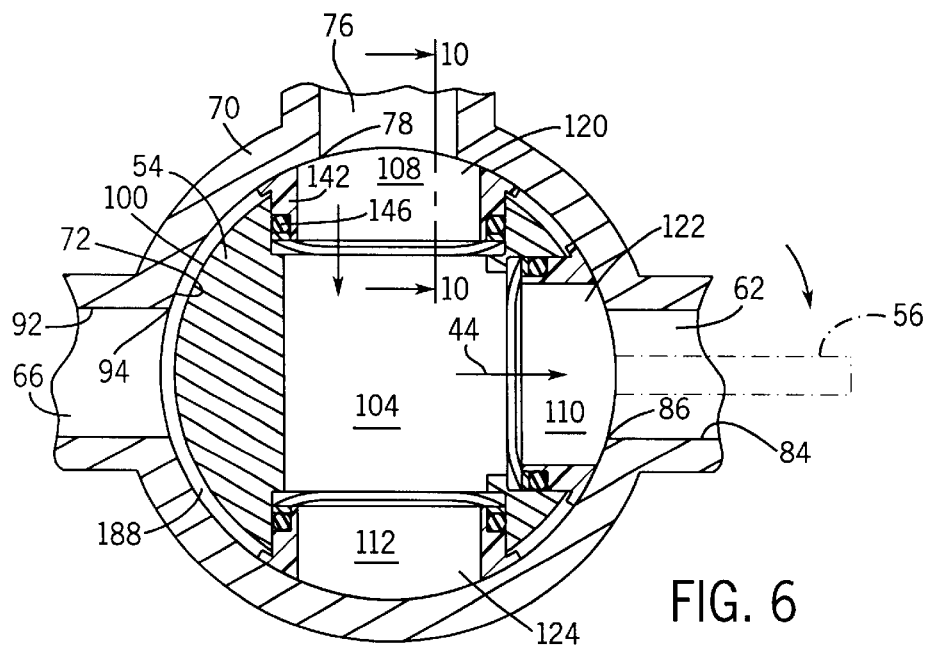
FIG. 6 is a sectional view taken along line 6—6 of FIG. 5.

Transfer passage 108 is modified to have first and second different inner diameter sections 156 and 158, FIGS. 4 and 10, meeting at an interface forming an annular shoulder 160. Inner diameter section 158 is radially outward of and of larger diameter than inner diameter section 156. Annular shoulder 160 faces radially outwardly in transfer passage 108. Annular biasing spring 148 in transfer passage 108 has an inner end 162 bearing against shoulder 160, and an outer end 164 bearing against seal element 142 to bias the latter radially outwardly against inner cylindrical wall 72 of valve body 70. Sleeve portion 150 has first and second different outer diameter sections 166 and 168 meeting at an interface forming an annular shoulder 170. Outer diameter section 168 is radially outward of and of larger diameter than outer diameter section 166. Annular shoulder 170 faces radially inwardly in transfer passage 108 and is spaced outwardly of annular shoulder 160 by an annular gap 172. Annular shoulders 160 and 170 face each other along the noted radial direction 152 across annular gap 172. Spring 148 is in annular gap 172 between shoulders 160 and 170. O-ring 146 is in annular gap 172 between annular shoulders 160 and 170, and is located between spring 148 and shoulder 170. O-ring 146 has a first annular sealing surface 174 engaging outer diameter section 166 of sleeve portion 150, and a second annular sealing surface 176 engaging inner diameter section 158 of transfer passage 108. Annular sealing surface 176 concentrically surrounds annular sealing surface 174. Annular shoulder 160 has a given depth at the noted interface between inner diameter sections 156 and 158 of transfer passage 108. O-ring 146 has a given thickness between annular sealing surfaces 174 and 176. The noted given depth is less than the noted given thickness. The diameter of outer diameter section 168 of sleeve portion 150 is substantially equal to the diameter of inner diameter section 158 of transfer passage 108. The diameter of outer diameter section 166 of sleeve portion 150 is less than the diameter of inner diameter section 156 of transfer passage 108.

Cylinder 102, FIG. 3, of valve member 54 is further modified to provide raised annular shoulders 180 and 182, FIGS. 3 and 5, having respective sealing O-rings 184 and 186 thereon, FIG. 5. In the prior art, O-rings 184 and 186 were recessed into cylinder 102. In the present invention, outer face portions 144 of seal elements 142 provide an annular gap 188, FIGS. 5, 10, between cylinder 102 of movable valve member 54 and inner cylindrical wall 72 of valve body 70. O-ring 184 provides sealing between the noted first and second sets of transfer passages and their respective radial ports. O-ring 186 provides sealing against exterior contamination. It has been found that the radial bias providing by wave washers 148 additionally provides a snug fit of cylinder 102 within interior 74 of the valve body sufficient to resist axial pull-out movement of the cylinder, thus eliminating the need for an axial stop. Alternatively, if desired, an axial stop can be provided by a set screw or the like as shown in phantom at 190, FIG. 5, axially locating cylinder 102 of valve member 54 within interior 74 of valve body 70 and preventing axial pull-out of valve member 54.

It is recognized that various equivalents, alternatives and modifications are possible within the scope of the appended claims.

What is claimed is:

1. A valve assembly comprising a stationary valve body having an inner cylindrical wall defining a hollow cylindrical interior extending along an axis and having at least one radial port having an inner end opening into said hollow interior, a movable valve member having an outer cylindrical wall defining a cylinder extending alone said axis in said hollow cylindrical interior of said valve body, said valve member being rotatable about said axis, said valve member having at least one interior passage and at least one transfer passage extending radially outwardly from said interior passage and having an outer end facing said inner cylindrical wall of said valve body, a valve seal assembly comprising a seal element having a hollow tubular sleeve portion in said transfer passage and slidable therealong in a radial direction relative to said axis, and an outer face portion engaging said inner cylindrical wall of said valve body and circumferentially movable across and into and out of radial alignment with said inner end of said radial port, said sleeve portion and said outer face portion having a central passage therethrough common and colinear with said transfer passage, said transfer passage having first and second different inner diameter sections meeting at an interface forming an annular shoulder, said second inner diameter section being radially outward of and of larger diameter than said first inner diameter section, said annular shoulder facing radially outwardly in said transfer passage, an annular biasing spring in said transfer passage and having an inner end bearing against said shoulder and an outer end bearing against said seal element to bias the latter against said inner cylindrical wall of said valve body, said spring and said sleeve portion concentrically surrounding and defining said central passage extending therethrough, wherein said spring, said shoulder and said sleeve portion are colinearly aligned annuli, said sleeve portion has first and second different outer diameter sections meeting at an interface forming a second annular shoulder, said second outer diameter section being radially outward of and of larger diameter than said first outer diameter section, said second annular shoulder facing radially inwardly in said transfer passage and spaced outwardly of said first mentioned annular shoulder by an annular gap, said first and second annular shoulders facing each other along said radial direction across said annular gap, wherein said spring is in said annular gap between said first and second annular shoulders.

2. The invention according to claim 1 comprising a sealing O-ring in said annular gap between said first and second annular shoulders, said O-ring having a first annular sealing surface engaging said first outer diameter section of said sleeve portion, and a second annular sealing surface engaging said second inner diameter section of said transfer passage, said second annular sealing surface concentrically surrounding said first annular sealing surface.

3. The invention according to claim 2 wherein said first annular shoulder has a given depth at said interface between said first and second inner diameter sections of said transfer passage, said O-ring has a given thickness between said first and second annular sealing surfaces, and wherein said given depth is less than said given thickness.

4. The invention according to claim 2 wherein said O-ring is between said second annular shoulder and said spring.

5. The invention according to claim 1 wherein the diameter of said second outer diameter section of said sleeve portion is substantially equal to the diameter of said second inner diameter section of said transfer passage.

6. The invention according to claim 1 wherein the diameter of said first outer diameter section of said sleeve portion is less than the diameter of said first inner diameter section of said transfer passage.

\* \* \* \* \*